United States Patent
Hayakawa

(10) Patent No.: US 6,695,456 B2
(45) Date of Patent: Feb. 24, 2004

(54) VEHICLE MIRROR ASSEMBLY

(75) Inventor: Eiichi Hayakawa, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 0 days.

(21) Appl. No.: 10/309,350

(22) Filed: Dec. 4, 2002

(65) Prior Publication Data

US 2003/0133205 A1 Jul. 17, 2003

(30) Foreign Application Priority Data

Dec. 6, 2001 (JP) .................................. 2001-372814

(51) Int. Cl.[7] .............................................. G02B 7/182
(52) U.S. Cl. ...................... 359/871; 359/872; 359/875
(58) Field of Search .............................. 359/871, 872, 359/875, 877, 881, 507, 841; 248/475.1, 479, 480, 636

(56) References Cited

U.S. PATENT DOCUMENTS

| 4,277,140 | A |   | 7/1981  | Manzoni |
| 4,477,150 | A | * | 10/1984 | Usami et al. ............... 359/874 |
| 4,488,778 | A |   | 12/1984 | Polzer et al. |
| 4,523,736 | A | * | 6/1985  | Manzoni ..................... 248/483 |
| 4,877,214 | A |   | 10/1989 | Toshiaki et al. |
| 4,951,912 | A | * | 8/1990  | Manzoni ..................... 359/514 |
| 5,299,060 | A | * | 3/1994  | Mori et al. ................. 359/514 |
| 5,305,144 | A | * | 4/1994  | Mori et al. ................. 359/507 |
| 6,070,845 | A | * | 6/2000  | Herskovitz ............. 248/346.01 |

FOREIGN PATENT DOCUMENTS

| GB | 2315721 A    | 2/1998  |
| JP | 57-191141 A  | 11/1982 |
| JP | 6-72241 A    | 3/1994  |
| JP | 10-181451 A  | 7/1998  |
| WO | WO 01/21439 A1 | 4/2001 |

OTHER PUBLICATIONS

British Search Report.

* cited by examiner

Primary Examiner—Mohammad Sikder
(74) Attorney, Agent, or Firm—Nixon Peabody, LLP

(57) ABSTRACT

In a vehicle door mirror assembly, an outer mirror-holder that holds a rearview mirror is mounted to an inner mirror-holder attached to a vehicle body side. Elastic tabs disposed at the outer mirror-holder elastically press an abutment portion of the inner mirror-holder. Thus, it is possible to maintain an excellent assembled state with respect to the inner mirror-holder and the outer mirror-holder, and to reduce loosening between the inner mirror-holder and the outer mirror-holder. It is therefore also possible to suppress vibration of the mirror with respect to the inner mirror-holder and to improve anti-chattering performance of the mirror.

9 Claims, 5 Drawing Sheets

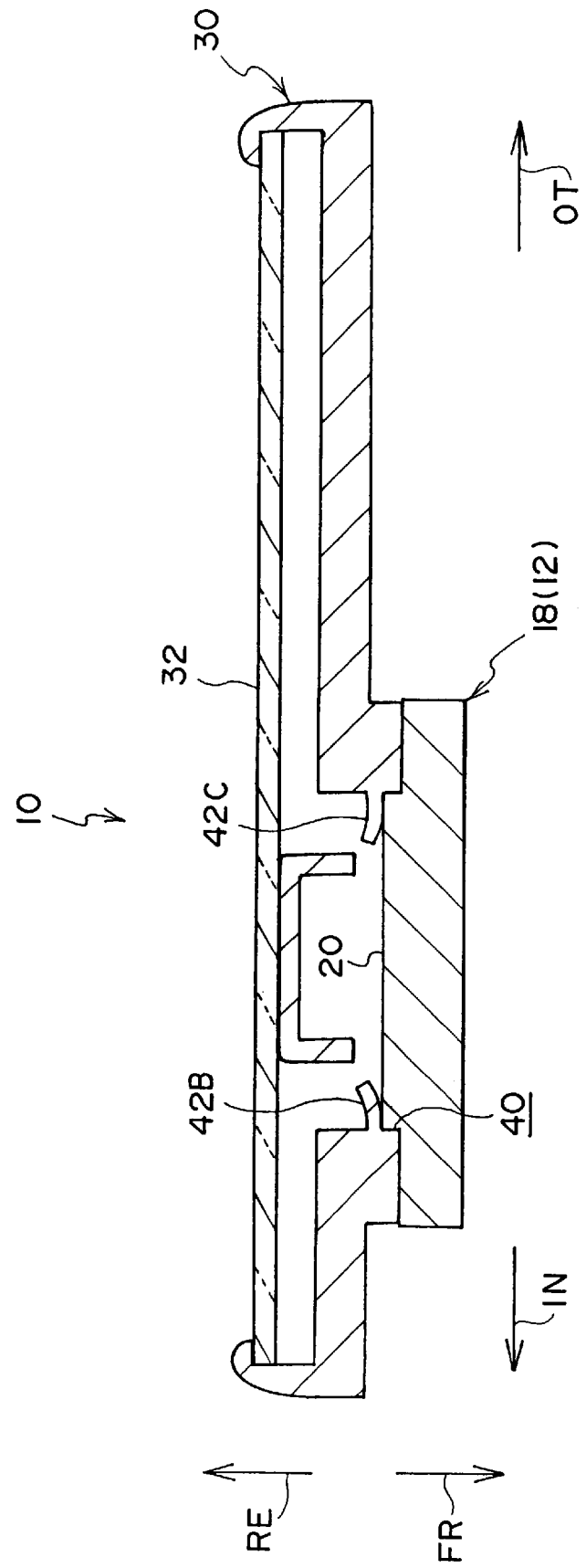

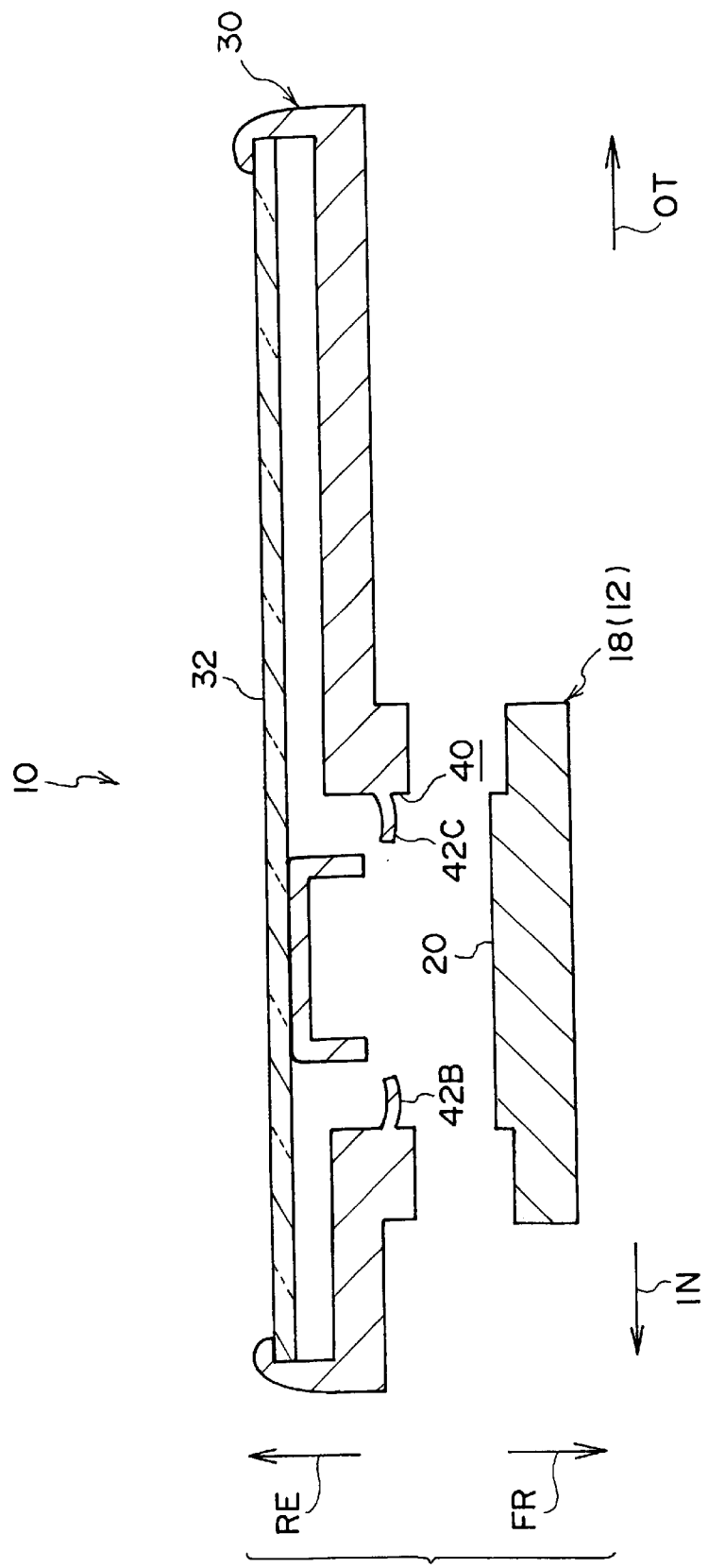

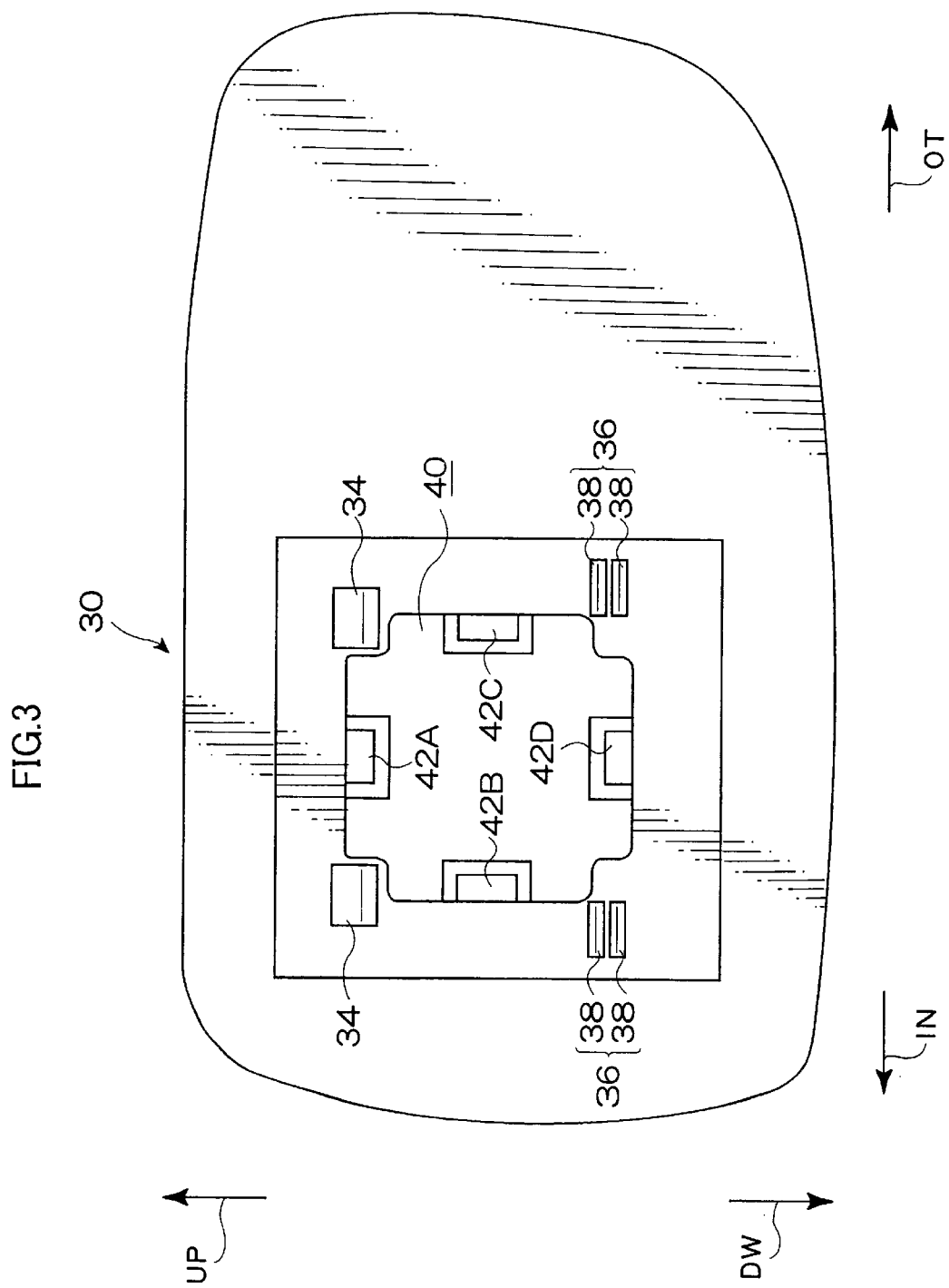

VEHICLE MIRROR ASSEMBLY

BACKGROUND OF THE INVENTION

1. Field of the Invention

The present invention relates to a vehicle mirror assembly disposed with a vehicle mirror.

2. Description of the Related Art

A vehicle mirror assembly is disposed with, for example, an outer mirror-holder. The outer mirror-holder holds a rearview mirror. The outer mirror-holder covers a front side (i.e., with respect to a vehicle disposed with the vehicle mirror assembly) of the mirror. Two substantially L-shaped claws are disposed at sites on an upper portion of the front side of the outer mirror-holder. Two nipping claws are disposed at sites on a lower portion of the front side of the outer mirror-holder. Each nipping claw includes a pair of projecting claws. Ends of the projecting claws project in mutually opposite directions.

The vehicle mirror assembly includes a mirror angle adjusting mechanism. The mirror angle adjusting mechanism is attached to a vehicle side. The mirror angle adjusting mechanism includes a mechanism body. The mechanism body supports a plate-shaped inner mirror-holder at a site on the rear side thereof. Two upper shafts that correspond to the two L-shaped claws are formed at an upper portion of the inner mirror-holder. Two lower shafts that correspond to the two nipping claws are formed at a lower portion of the inner mirror-holder.

The outer mirror-holder is mounted to the inner mirror-holder by snap-fitting the lower shafts between the pairs of projecting claws of the nipping claws in a state in which the upper shafts are caught on the L-shaped claws. Therefore, the inner mirror-holder (i.e., the mirror angle adjusting mechanism) supports the mirror via the outer mirror-holder.

However, in such a vehicle mirror assembly, the outer mirror-holder is mounted to the inner mirror-holder simply by the catch of the upper shafts on the L-shaped claws and the snap-fit of the lower shafts between the pairs of projecting claws of the nipping claws, as described above.

There is thus the potential to be unable to maintain an excellent catch of the upper shafts on the L-shaped claws and an excellent snap-fit of the lower shafts between the pairs of the projecting claws of the nipping claws. Therefore, there is the potential for loosening (particularly loosening in the longitudinal direction of the vehicle (i.e., a direction parallel to the direction in which the outer mirror-holder faces the inner mirror-holder)) to occur between the inner mirror-holder and the outer mirror-holder.

For this reason, there is also the potential for anti-chattering performance of the mirror to drop as a result of the mirror vibrating with respect to the inner mirror-holder.

SUMMARY OF THE INVENTION

In view of the aforementioned facts, it is an object of the invention to provide a vehicle mirror assembly that can reduce loosening between a holding member and a mounting member and also improve anti-chattering performance of a mirror.

A vehicle mirror assembly according to a first aspect of the invention comprises: a holding member for holding a rearview mirror; a mounting member for supporting the mirror via the holding member, the mounting member being attached to a vehicle body side and mounted with the holding member; and an elastic member disposed at one of the holding member and the mounting member at a site thereon other than a mounting site where the holding member mounts to the mounting member, the elastic member being elastic and elastically pressing the other of the holding member and the mounting member.

In the vehicle mirror assembly of the first aspect, the holding member that holds the rearview mirror is mounted to the mounting member attached to the vehicle body side. Therefore, the mounting member supports the mirror via the holding member.

The elastic member, which is disposed at one of the holding member and the mounting member at the site thereon other than the mounting site where the holding member mounts to the mounting member, is elastic. The elastic member elastically presses the other of the holding member and the mounting member.

It is thus possible to maintain an excellent state of assembly with respect to the holding member and the mounting member. Therefore, it is possible to reduce loosening between the holding member and the mounting member.

It is also thus possible to suppress vibration of the mirror with respect to the mounting member. Therefore, it is possible to improve anti-chattering performance of the mirror.

A vehicle mirror assembly according to a second aspect of the invention comprises the vehicle mirror assembly of the first aspect, wherein the elastic pressing direction of the elastic member is parallel to a direction in which the mounting member faces the holding member.

In the vehicle mirror assembly of the second aspect, the elastic pressing direction of the elastic member is parallel to a direction in which the mounting member faces the holding member. Thus, it is not only possible to effectively reduce loosening between the mounting member and the holding member in the direction parallel to the direction in which the mounting member faces the holding member but also to effectively improve anti-chattering performance of the mirror when the loosening easily occurs.

A vehicle mirror assembly according to a third aspect of the invention comprises the vehicle mirror assembly of the first aspect, further including a support member for supporting the mounting member, with the elastic member being disposed at a position facing a support site at which the mounting member is supported by the support member.

In the vehicle mirror assembly of the third aspect, the mounting member is supported by the support member. Thus, it becomes unlikely for vibration to occur at the support site where the mounting member is supported by the support member. The elastic member is disposed at the position facing the support site of the mounting member, at which site vibration is unlikely to occur. Therefore, it is possible to further suppress vibration of the mirror with respect to the mounting member and to further improve anti-chattering performance of the mirror.

A vehicle mirror assembly according to a fourth aspect of the invention comprises: a holding member for holding a vehicle mirror; a mounting member to which the holding member is mounted; and an elastic member disposed at a site on one of the holding member and the mounting member other than a mounting site where the holding member mounts to the mounting member, the elastic member elastically pressing the other of the holding member and the mounting member.

A method of manufacturing the vehicle mirror assembly of the invention, in which the vehicle mirror assembly includes a holding member for holding a vehicle mirror and a mounting member to which the holding member is mounted, the method comprising the steps of: disposing an elastic member at a site on one of the holding member and the mounting member other than a mounting site where the holding member mounts to the mounting member; and mounting the holding member to the mounting member so the elastic member elastically presses the other of the holding member and the mounting member.

A vehicle of the invention is disposed with the vehicle mirror assembly of the first aspect.

BRIEF DESCRIPTION OF THE DRAWINGS

FIG. 1 is a cross-sectional view showing an inner mirror-holder, an outer mirror-holder, and a mirror in a vehicle door mirror assembly pertaining to an embodiment of the present invention;

FIG. 2 is an exploded cross-sectional view showing the inner mirror-holder, the outer mirror-holder, and the mirror in the vehicle door mirror assembly pertaining to the embodiment of the invention;

FIG. 3 is a rear view showing the outer mirror-holder in the vehicle door mirror assembly pertaining to the embodiment of the invention;

DESCRIPTION OF THE PREFERRED EMBODIMENT

Figure 4A:
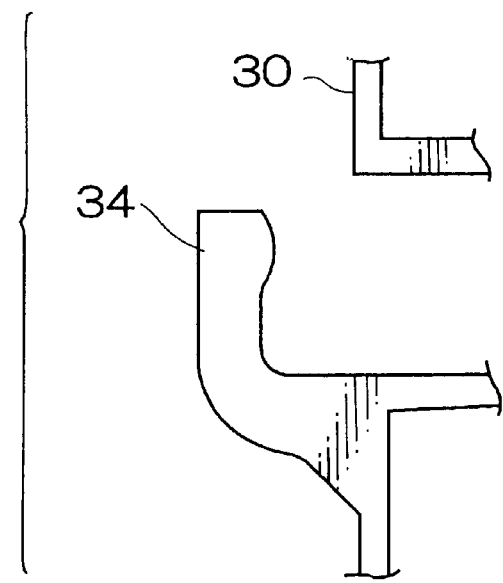
FIG. 4A is a side view showing an L-shaped claw in the vehicle door mirror assembly pertaining to the embodiment of the invention.

FIG. 1 shows, in cross section, the main parts of a vehicle door mirror assembly 10 pertaining to an embodiment to which a vehicle mirror assembly of the invention has been applied. FIG. 2 shows, in exploded cross section, the main parts of the vehicle door mirror assembly 10. It will be noted that, in the drawings, the direction of the front of a vehicle disposed with the vehicle door mirror assembly 10 is indicated by the arrow labeled FR, the direction of the rear of the vehicle is indicated by the arrow labeled RE, the direction of the inner side of the vehicle is indicated by the arrow labeled IN, the direction of the outer side of the vehicle is indicated by the arrow labeled OT, up is indicated by the arrow labeled UP, and down is indicated by the arrow labeled DW. Moreover, terms such as "front side", "rear side", "inner side", "outer side" and the like refer to directions with respect to the vehicle disposed with the vehicle door mirror assembly 10.

The vehicle door mirror assembly 10 pertaining to the present embodiment is disposed with a door mirror stay (not illustrated). The door mirror stay is fixed to a vehicle door (not illustrated). A retracting mechanism (not illustrated) is fixed to the door mirror stay. A plate-shaped frame (not illustrated) is fixed to the retracting mechanism. A door mirror visor (not illustrated) is fixed to the frame. The door mirror visor covers a front side of the retracting mechanism, the frame, a mirror angle adjusting mechanism 12, and an outer mirror-holder 30.

Figure 5:
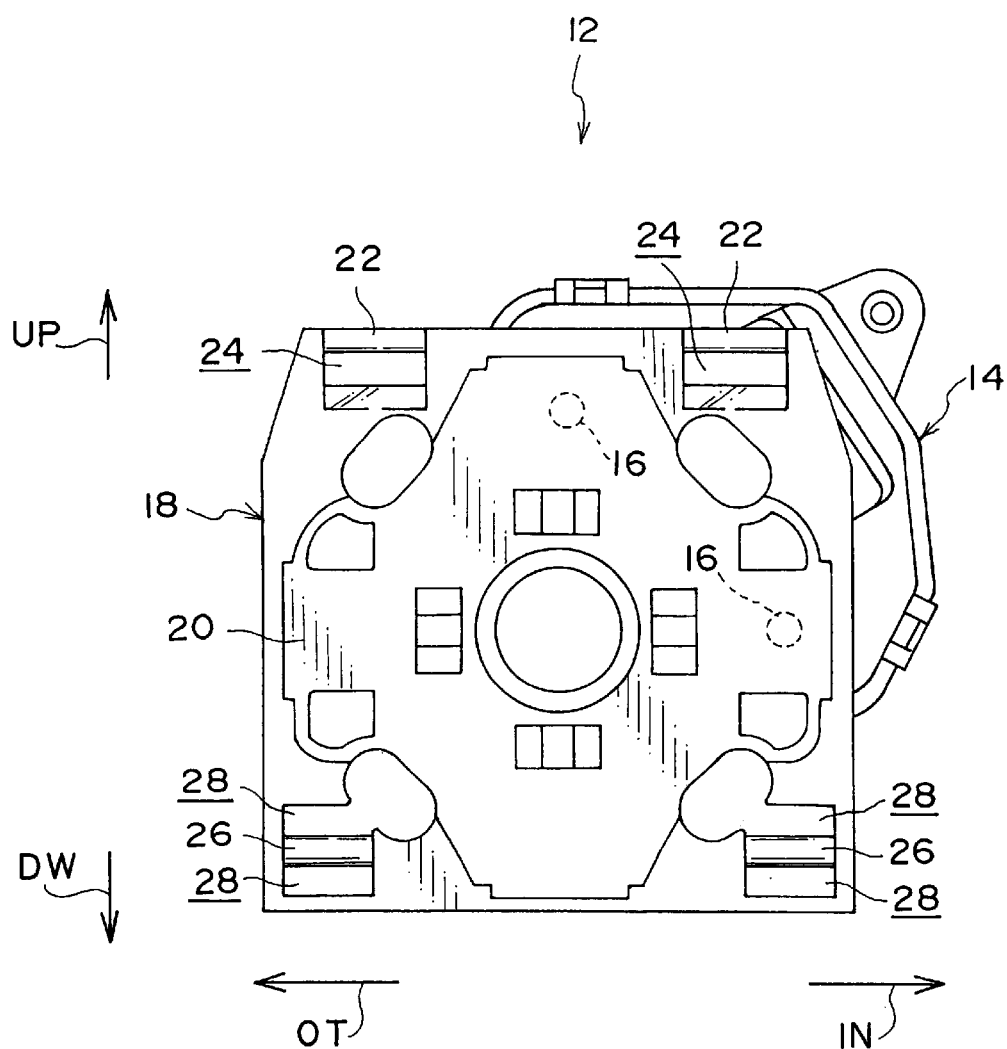
FIG. 5 is a front view showing a mirror angle adjusting mechanism (including the inner mirror-holder) in the vehicle door mirror assembly pertaining to the embodiment of the invention.

The mirror angle adjusting mechanism 12 is disposed at a site on a rear side of the frame. As shown in FIG. 5, the mirror angle adjusting mechanism 12 includes a mechanism body 14. The mechanism body 14 is fixed to the frame. Two rods 16, which serve as support members, are disposed on the mechanism body 14. Each rod 16 projects in the direction of the vehicle rear from the mechanism body 14. Each rod 16 is moveable in the longitudinal direction of the vehicle.

A plate-shaped, generally square inner mirror-holder 18, which serves as a mounting member, is tiltably supported at a central site thereof at a site on the rear side of the mechanism body 14. The inner mirror-holder 18 is thus attached to a side of the vehicle via the mechanism body 14, the frame, the retracting mechanism, and the door mirror stay.

An upper center and an inner side end center of the inner mirror-holder 18 respectively hold ends of the rods 16 (i.e., are supported by the rods 16). The inner mirror-holder 18 is tilted by moving each rod 16 in the longitudinal direction of the vehicle. A thin, flat, substantially cross-shaped abutment portion 20, which serves as an insert, is formed on the inner mirror-holder 18. The abutment portion 20 projects in the rear direction of the vehicle.

An upper shaft 22 is disposed near each angled portion at an upper portion of the inner mirror-holder 18. Directly below each upper shaft 22 is formed an upper hole 24. Additionally, a lower shaft 26 is disposed near angled portions at a bottom portion of the inner mirror-holder 18. Directly above and below each upper shaft are formed lower holes 28.

The outer mirror-holder 30 is disposed at a rear side of the inner mirror-holder 18. The outer mirror-holder 30 holds a rearview mirror 32. The outer mirror-holder 30 covers a front side of the mirror 32.

As shown in FIG. 3, two substantially L-shaped claws 34, which correspond to the upper shafts 22, are disposed at an upper portion of a front side of the outer mirror-holder 30. As shown in detail in FIG. 4A, each L-shaped claw 34 projects in the direction of the front of the vehicle from the outer mirror-holder 30. An end of each L-shaped claw 34 extends upwards. A leading end of each L-shaped claw 34 projects in the rear direction of the vehicle.

Figure 4B:
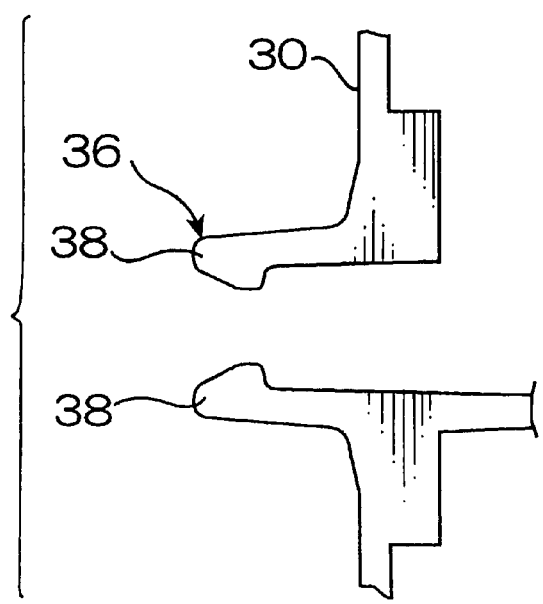
FIG. 4B is a side view showing a nipping claw in the vehicle door mirror assembly pertaining to the embodiment of the invention.

Two nipping claws 36, which correspond to the lower shafts 2, are disposed at sites at a lower portion of the front side of the outer mirror-holder 30. As shown in detail in FIG. 4B, each nipping claw 36 includes a pair of elastic projecting claws 38. The pairs of projecting claws 38 project in the direction of the front of the vehicle from the outer mirror-holder 30. The pairs of projecting claws 38 mutually face each other in the vertical direction. Ends of the projecting claws 38 project in mutually opposite directions.

The outer mirror-holder 30 is mounted to the inner mirror-holder 18 by inserting the pairs of projecting claws 38 of the nipping claws 36 into the respective lower holes 28 and snap-fitting each of the lower shafts 26 between the pairs of projecting claws 38 in a state in which each of the L-shaped claws 34 has been inserted into the respective upper holes 24 so that each of the upper shafts 22 catches on each of the L-shaped claws 34. The inner mirror-holder 32 (the mirror angle adjusting mechanism 12) thus supports the mirror 32 via the outer mirror-holder 30. The mirror 32 is tilted and the mirror angle of the mirror 32 is adjusted by, as described above, the rods 16 being moved in the longitudinal direction of the vehicle and the inner mirror-holder 18 being tilted. Moreover, due to the locking of the L-shaped claws 34 by the upper shafts 22 and to the elastic locking of the nipping claws 36 (i.e., the projecting claws 38) by the lower shafts 26, loosening and vibration in the vertical direction of the outer mirror-holder 30 with respect to the inner mirror-holder 18 is suppressed.

A substantially cross-shaped hole 40, which serves as an insertion hole corresponding to the abutment portion 20, is formed at the front side of the outer mirror-holder 30. The abutment portion 20 is inserted into the cross-shaped hole 40. A predetermined number (four in the present embodiment) of elastic tabs 42A, 42B, 42C, and 42D, which serve as elastic members, is integrally disposed at inner peripheral walls of the cross-shaped hole 40. The elastic tabs 42A, 42B, 42C, and 42D are elastic. The elastic tabs 42A, 42B, 42C, and 42D have a thin, curved tab shape and project towards the abutment portion 20.

The elastic tab 42A is disposed at an upper end within the cross-shaped hole 40. The elastic tab 42A is disposed at substantially the same position in the vertical direction as the L-shaped claw 34. The elastic tab 42B is disposed at an inner side end within the cross-shaped hole 40. The elastic tab 42C is disposed at an outer side end within the cross-shaped hole 40. The elastic tabs 42B and 42C are disposed at substantially intermediate positions in the vertical direction between the L-shaped claws 34 and the nipping claws 36. The elastic tab 42D is disposed at a lower end within the cross-shaped hole 40. The elastic tab 42D is disposed at substantially the same position in the vertical direction as the nipping claws 36.

The elastic tabs 42A, 42B, 42C, and 42D elastically abut against the abutment portion 20. The inner mirror-holder 18 is thus elastically pressed by the elastic tabs 42A, 42B, 42C, and 42D in the direction of the vehicle front.

The vehicle door mirror assembly 10 is manufactured by a method comprising at least the steps of: disposing the elastic tabs 42A, 42B, 42C, and 42D at sites on the outer mirror-holder 30 (within the cross-shaped hole 40) other than sites where the outer mirror-holder 30 mounts to the inner mirror-holder 18; and mounting the outer mirror-holder 30 to the inner mirror-holder 18 so that the elastic tabs 42A, 42B, 42C, and 42D elastically press the inner mirror-holder 18 (the abutment portion 20).

The operation of the present embodiment will now be described.

In the vehicle door mirror assembly 10 having the above-described structure, the outer mirror-holder 30, which holds the rearview mirror 32, is mounted to the inner mirror-holder 18, which is attached to a side of the vehicle, by the catch of the upper shafts 22 on the L-shaped claws 34 and the snap-fitting of the lower shafts 26 between the pairs of the projecting claws 38 of the nipping claws 36. The inner mirror-holder 18 thus supports the mirror 32 via the outer mirror-holder 30.

The elastic tabs 42A, 42B, 42C, and 42D, which are disposed at sites on the outer mirror-holder 30 other than sites where the outer mirror-holder 30 mounts to the inner mirror-holder 18 (i.e., sites at which the L-shaped claws 34, nipping claws 36, upper shafts 22, and lower shafts 26 are disposed), are elastic. The elastic tabs 42A, 42B, 42C, and 42D elastically press the abutment portion 20 of the inner mirror-holder 18.

It is therefore possible to maintain an excellent state of assembly with respect to the outer mirror-holder 30 and the inner mirror-holder 18. Therefore, it is possible to reduce loosening between the outer mirror-holder 30 and the inner mirror-holder 18.

It is also therefore possible to suppress vibration of the mirror 32 with respect to the inner mirror-holder 18. Thus, anti-chattering performance of the mirror 32 can be improved.

The direction in which the elastic tabs 42A, 42B, 42C, and 42D are elastically pressed is towards the vehicle front (i.e., parallel to the direction in which the inner mirror-holder 18 faces the outer mirror-holder 30). Thus, it is not only possible to effectively reduce loosening between the outer mirror-holder 30 and the inner mirror-holder 18 in the longitudinal direction of the vehicle but also to effectively improve anti-chattering performance of the mirror 32 when the loosening easily occurs.

In particular, the elastic tab 42A is disposed at substantially the same position in the vertical direction as the L-shaped claws 34. Moreover, the positions in the vertical direction of the elastic tabs 42B, 42C, and 42D differ from those of the L-shaped claws 34. Therefore, it is possible for the elastic tab 42A to excellently suppress loosening and vibration between the ends of the L-shaped claws 34 and the upper shafts 22. Moreover, it is possible for the end projections of the projecting claws 38 of the nipping claws 36 to excellently engage with the lower shafts 26 due to the elastic tabs 42B, 42C, and 42D. Therefore, it is possible to excellently hinder tilting of the outer mirror-holder 30 around the upper shafts 22.

The elastic tab 42D is disposed at substantially the same position in the vertical direction as the nipping claws 36. Moreover, the positions in the vertical direction of the elastic tabs 42A, 42B, and 42C differ from those of the nipping claws 36. Therefore, it is possible for the elastic tab 42D to excellently suppress loosening and vibration between the end projections of the projecting claws 38 of the nipping claws 36 and the lower shafts 26. Moreover, it is possible for the ends of the L-shaped claws 34 to excellently engage with the upper shafts 22. Therefore, it is possible to excellently hinder tilting of the outer mirror-holder 30 around the lower shafts 26.

Furthermore, the inner mirror-holder 18 is supported by the rods 16. Therefore, it is unlikely for vibration to occur at support sites (the upper center and inner side end center) at which the inner mirror-holder 18 is supported by the rods 16. Also, the elastic tabs 42A and 42B are disposed at positions facing the support sites at which vibration is unlikely to occur. Therefore, vibration of the mirror 32 with respect to the inner mirror-holder 18 can be further suppressed, and anti-chattering performance of the mirror 32 can be further improved.

In the present embodiment, it is possible to appropriately select the elastic force of the elastic tabs 42A, 42B, 42C, and 42D. Thus, a structure is possible in which the elastic tabs 42A, 42B, 42C, and 42D have respectively different elastic forces. Furthermore, a structure is possible in which some or all of the elastic tabs 42A, 42B, 42C, and 42D have the same elastic force.

Moreover, in the present embodiment, the elastic tabs 42A, 42B, 42C, and 42D are disposed on the outer mirror-holder 30. However, a structure is also possible in which the elastic tab (the elastic member) is disposed on the inner mirror-holder (the mounting member).

Also, in the present embodiment, the vehicle mirror assembly of the invention is applied to the vehicle door mirror assembly 10. However, the vehicle mirror assembly of the invention may also be applied to a vehicle fender mirror assembly, a vehicle interior mirror assembly, or the like.

What is claimed is:

1. A vehicle mirror assembly comprising:

a holding member for holding a vehicle mirror;

a mounting member to which the holding member is mounted; and an elastic member disposed at a site on one of the holding member and the mounting member other than a mounting site where the holding member mounts to the mounting member, the elastic member elastically pressing the other of the holding member and the mounting member.

2. The vehicle mirror assembly of claim 1, wherein the elastic pressing direction of the elastic member is parallel to a direction in which the mounting member faces the holding member.

3. The vehicle mirror assembly of claim 1, further including a support member for supporting the mounting member, with the elastic member being disposed at a position facing a support site at which the mounting member is supported by the support member.

4. The vehicle mirror assembly of claims 1, wherein the number of the mounting site is plural, and the elastic member is disposed at a position along a straight line that passes through two of the mounting sites.

5. The vehicle mirror assembly of claim 4, wherein the elastic member is disposed at a position on the straight line between the two mounting sites.

6. The vehicle mirror assembly of claims 1, wherein the number of the mounting site is plural, and the elastic member is disposed at a side of a straight line passing through two of the mounting sites.

7. The vehicle mirror assembly of claim 6, wherein the elastic member is disposed at a side of the straight line between the two mounting sites.

8. The vehicle mirror assembly of claims 1, wherein an insert disposed at one of the holding member and the mounting member is inserted through an insertion hole disposed at the other of the holding member and the mounting member.

9. The vehicle mirror assembly of claim 8, wherein the elastic member is disposed at one of the insertion hole and the insert.

\* \* \* \* \*